United States Patent [19]

Dahlheimer

[11] Patent Number: 5,676,382
[45] Date of Patent: Oct. 14, 1997

[54] MECHANICAL FACE SEAL ASSEMBLY INCLUDING A GASKET

[75] Inventor: John C. Dahlheimer, Laconia, N.H.

[73] Assignee: Freudenberg NOK General Partnership, Plymouth, Mich.

[21] Appl. No.: 468,705

[22] Filed: Jun. 6, 1995

[51] Int. Cl.⁶ ............................................. F16J 15/38
[52] U.S. Cl. ............................................. 277/92
[58] Field of Search ........................ 277/1, 22, 38, 277/39, 88, 87, 92

[56] References Cited

U.S. PATENT DOCUMENTS

| | | | |
|---|---|---|---|
| 2,149,974 | 3/1939 | McCormack | 277/92 |
| 2,760,794 | 8/1956 | Hartranft | 277/92 |
| 2,888,280 | 5/1959 | Meyer et al. | 277/88 |
| 3,031,199 | 4/1962 | Laser et al. | 277/92 |
| 3,061,319 | 10/1962 | Snyder | 277/92 |
| 3,291,493 | 12/1966 | Blair | 277/92 |
| 3,782,735 | 1/1974 | Novosad | 277/92 |
| 4,239,241 | 12/1980 | Menager | 277/92 |
| 4,365,816 | 12/1982 | Johnson et al. | 277/92 |
| 4,779,876 | 10/1988 | Novosad | 277/92 |
| 5,199,719 | 4/1993 | Heinrich et al. | 277/92 |

FOREIGN PATENT DOCUMENTS

| | | | |
|---|---|---|---|
| 3820581 | 12/1989 | Germany | 277/92 |
| 4005721 | 9/1991 | Germany | 277/92 |
| 616631 | 1/1949 | United Kingdom | 277/92 |
| 634989 | 3/1950 | United Kingdom | 277/92 |

Primary Examiner—William A. Cuchlinski, Jr.
Assistant Examiner—John L. Beres
Attorney, Agent, or Firm—Dinnin & Dunn, P.C.

[57] ABSTRACT

An improved seal assembly utilizing a cup gasket having a flange portion secured or sandwiched between side surface of a mating ring and an inner surface of a radially extending side portion of an inner sleeve such that a static seal occurs in an axial direction. The seal further including a gap between an inner circumferential surface of the mating ring and the outer circumferential surface of the inner sleeve to detect any leakage past the static seal. Such a seal assures a long-term sealed mounting of the mating ring regardless of elastomer compressions set, shrinkage, or thermal contraction.

16 Claims, 8 Drawing Sheets

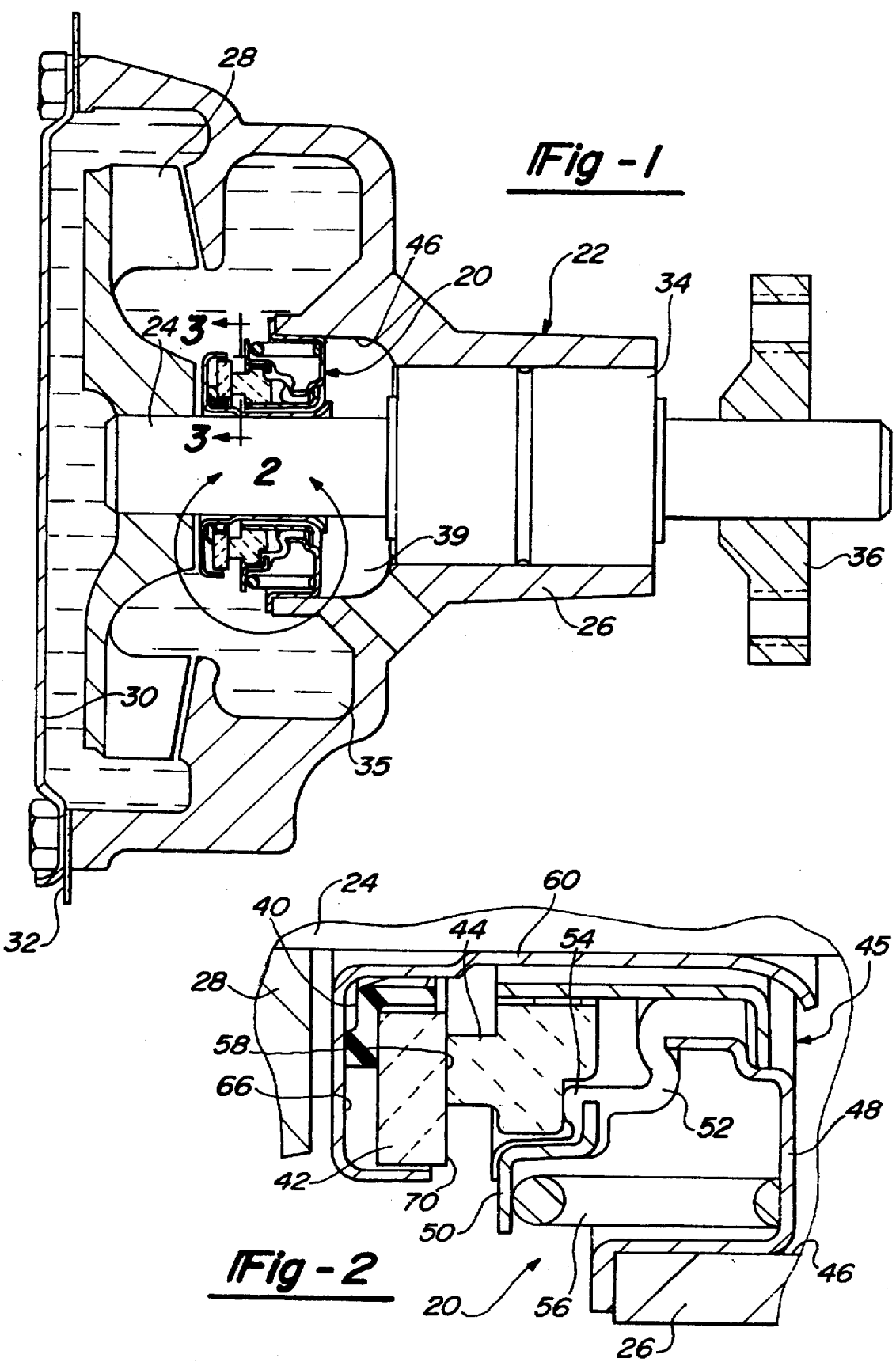

MECHANICAL FACE SEAL ASSEMBLY INCLUDING A GASKET

BACKGROUND OF THE INVENTION

1. Field of the Invention

The invention pertains to a fluid seal for use in sealing a rotating member. More particularly, the seal includes a gasket for mounting and sealing a mating ring of a mechanical face seal assembly.

2. Description of the Related Art

Mechanical face seal assemblies provide a fluid seal between a housing member and a shaft, one of which is rotating with respect to the other. Typically, the housing is stationary and the shaft is rotating. The seal prevents fluid loss between the shaft and housing.

A mechanical face seal assembly normally includes a seal ring and a mating ring. The mating ring is mounted such that it rotates with the shaft while the seal ring remains stationary. The seal ring is axially loaded; i.e., a spring or other force transmitting member urges the seal ring in the axial direction of the shaft. The axially transmitted force urges the seal ring into engagement with the mating ring to provide the fluid seal. Such assemblies are known in the prior art, see for example U.S. Pat. No. 3,061,319. Seal assemblies of this type are known as dynamic seals in that one of the seal elements, in this case the mating ring, moves with respect to a corresponding stationary seal element, here the seal ring. The seal assembly further includes additional static seal elements; i.e., stationary seals for sealing the mating ring and seal ring respectively.

As shown in U.S. Pat. No. 3,061,319, the mating ring includes a static seal in the form of a gasket disposed between the housing and the mating ring. The mating ring is mounted such that compressed frictional engagement occurs between a gasket and a circumferential outer surface of the mating ring and an inner circumferential surface of the housing. Such a mounting arrangement provides a seal due to radial compression of a leg portion of the gasket; i.e., that portion of the gasket disposed between the outer circumferential surface of the mating ring and the inner circumferential surface of the housing. Such a seal assembly has an advantage in that it places the mating ring in compression to minimize tensile stresses. Minimizing stresses occurring in the mating ring reduces potential cracking and thus occurrences of failure of the mating ring during use. However, one disadvantage of such a mounting and sealing arrangement is that the gasket substantially covers and insulates the outermost or outer circumferential surface of the mating ring. Insulating the mating ring reduces or impedes heat transfer to the sealed fluid; i.e., the heat built up due to frictional forces resulting from engagement of the mating ring and the seal ring during operation is not allowed to escape into the sealed fluid. Such heat build-up results in increased thermal stress on the seal resulting in potential failure. It has been determined that it is advantageous to conduct the heat occurring during seal operation outward into the surrounding sealed fluid to reduce seal stress and increase the lifetime of the seal.

It is also known to place a gasket on the inside diameter; i.e., between the inner surface of the mating ring and the shaft or a sleeve mounted on the shaft. The gasket is radially compressed in the area between the inner diameter or circumferential surface of the mating ring and the outer diameter or outer circumferential surface of the shaft or a sleeve fitted to the shaft. Compressing the gasket, normally an elastomeric member, results in a static seal between the mating ring and the shaft or sleeve fitted to the shaft. To assure long term static sealing, the force necessary to compress the gasket must be of a sufficient amount to overcome potential problems such as elastomer compression-set, creep, stress relaxation and any shrinkage of the gasket due to exposure to the fluid being sealed. Additionally, the gasket may lose its compressive sealing force when used in a low temperature environment due to thermal contraction. Finally, the tolerances of the inside diameter of the mating ring, the outside diameter of the shaft or sleeve fitted to the shaft, and the size of the gasket itself may result in an unsatisfactory variance in the compressive force being exerted to achieve a proper static seal. In practice, it has been determined that providing compressive force sufficient to ensure long-term static sealing may apply a radial force to the inside diameter of the mating ring which may cause cracking resulting in failure of the mating ring.

While it is known in the prior art to extend a portion of the gasket between an axial side surface of the mating ring and the housing or sleeve fixed to the shaft, such an arrangement has not been used in the past to provide a static seal. As the static seal is accomplished by the radial compression of the gasket between the mating ring and housing or sleeve fixed to the shaft, no reliable method is in place for testing the integrity of any potential seal occurring between the respective axial surfaces of the mating ring and housing or sleeve fixed to the shaft. Thus, any potential axial seal is not tested for reliability. As conventional seals rely on radial compression of the gasket, which eventually fails, any attempt to fall back on an axial seal is unreliable, as the axial seal cannot be prequalified or tested.

SUMMARY OF THE INVENTION

Accordingly, the present invention is a unique seal assembly having a gasket positioned between axial sealing surfaces of the mating ring and housing or sleeve secured to the shaft such that the seal is formed by axial compression of the gasket. The axial force is applied to the mating ring by the seal ring. The seal does not utilize radial compression of the gasket to provide a static seal. The gasket is secured to the mating ring in such a manner that a clearance or gap is present between at least a portion of the mating ring and gasket and a further clearance or gap is present in at least a portion of the sleeve and or housing and the gasket. The gap or clearance is created by the width of the portion of the gasket between the mating ring and shaft or sleeve attached to the shaft being less than the width of the annulus or space between the mating ring and shaft or sleeve attached to the shaft. Such a clearance allows for prequalification and leak testing of the axial seal surface to ensure seal integrity.

In the preferred form, the seal assembly includes an inner sleeve disposed over and secured to the shaft. The inner sleeve includes a side portion extending radially outward and having an axial inner surface facing in the direction of the longitudinal axis of the shaft. The inner sleeve further includes an inner circumferential flange having an outer circumferential surface and an inner circumferential surface. The inner circumferential surface frictionally engages the shaft such that the sleeve rotates with the shaft. A mating ring, typically formed of a high-strength ceramic material, is positioned about the inner sleeve. The mating ring includes an inner circumferential surface, an outer circumferential surface, an axially facing side surface and an axially facing mating surface.

To effect a static fluid seal between the mating ring and inner sleeve, a gasket including a radially extending flange portion and an axially extending tubular portion is positioned such that the flange portion is placed between the axial inner surface of the inner sleeve and the axially facing side surface of the mating ring. An axial load applied to the mating surface of the mating ring compresses the flange portion of the gasket to form the static seal between the inner sleeve and mating ring and prevent loss of a sealed fluid contained within a housing area. Further, the axially extending tubular portion of the gasket is positioned between the mating ring and inner sleeve such that a gap or clearance extends along at least a portion of the tubular portion/mating ring and tubular portion/inner sleeve interfaces such that a significantly reduced radial mounting force is applied to the inside diameter of the mating ring. Additionally, the clearance provides an open channel to detect any leakage between the flange portion of the gasket and mating ring even at minimal pressures. Further, the clearance between the tubular portion and inner sleeve allows the detection of any leakage between the flange portion of the gasket and the inner surface of the side portion of the inner sleeve.

One advantage of the present invention is that as the seal occurs at axial surfaces, the seal may be tested prior to part or seal usage. Additionally, the seal allows the use of ceramic mating rings as the mating rings are not subjected to high tensile stresses typically occurring when the gasket is radially mounted between the shaft or sleeve member and the mating ring. Thus, the present invention provides a reliable static axial seal between the mating ring and the shaft or sleeve attached to the shaft while eliminating the problems typically occurring with radial compression mounted mechanical face seals.

BRIEF DESCRIPTION OF THE DRAWINGS

FIG. 1 is a sectional side view of a seal assembly according to the present invention illustrated in use with a pump mechanism.

FIG. 2 is an enlarged sectional view of the portion in circle 2—2 of FIG. 1.

DESCRIPTION OF THE PREFERRED EMBODIMENT(S)

Figure 2A:
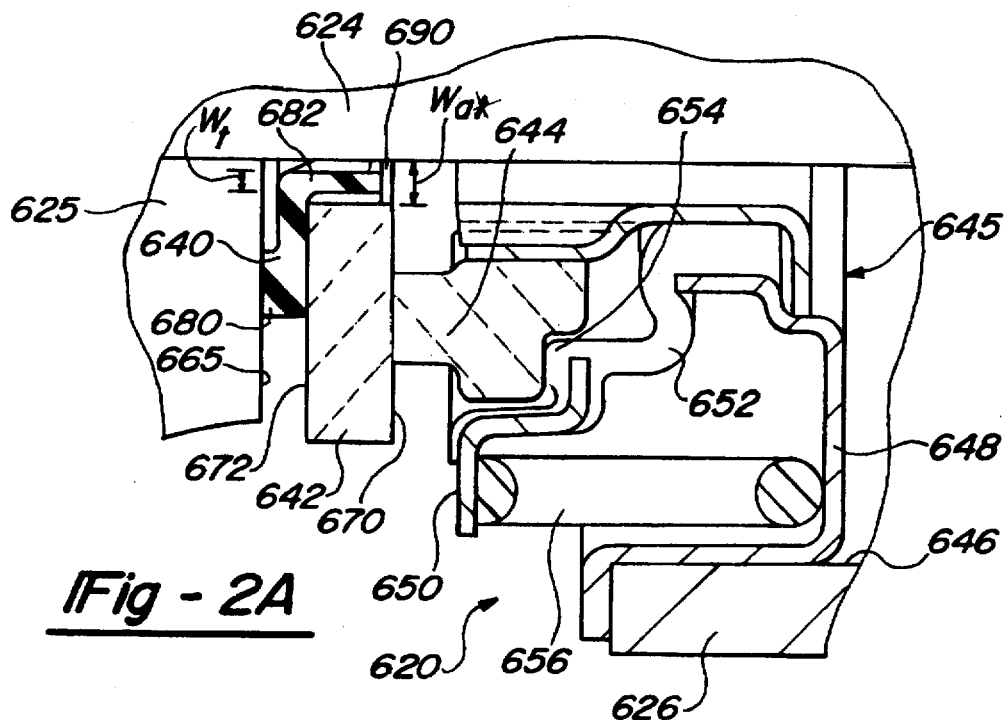
FIG. 2a is an enlarged sectional view of the portion in circle 2—2 of FIG. 1 illustrating a first alternative embodiment.

Referring to the drawings, and more particularly to FIGS. 1 and 2 thereof, a seal assembly, seen generally as 20, is shown for use with a pump mechanism 22. By way of illustration, the pump mechanism 22 is a water pump containing a shaft 24 rotatably mounted within a stationary housing 26 through a plurality of bearings 34. An impeller 28 is connected to the shaft 24, and the housing is sealed via a cover plate 30 and gasket 32. A drive hub 36, engaged to a drive mechanism (not shown) transfers power to rotate the impeller 28 thus pumping a fluid 35 through the housing 26. As shown in FIG. 1, the seal assembly 20 provides a barrier preventing the fluid 35 from entering an air space 39 opposite the bearing 34.

As illustrated in FIG. 2, the seal assembly 20 according to the present invention includes a seal casing 45 formed of two halves, an outer case 48 and an inner case 49. The seal assembly further includes an inner sleeve 60, typically secured to the shaft 24. The outer case 48 is secured within a mounting socket 46 of the housing 26. The outer case 48 of the seal casing 45 is pressed into the mounting socket 46 and provides a stationary support for a seal ring 44. A flange ring 50 is interconnected with the seal casing 45 by a seal element 52 sandwiched between the outer case 48 and the inner case 49. A shoulder portion 54 of the seal element 52 engages the seal ring 44. A spring 56 positioned between the flange ring 50 and the outer case 48 acts to urge the shoulder 54 of the seal element 52 and corresponding seal ring 44 in an axial direction; i.e., along or parallel the axis of the shaft 24. Urging or providing a force against the seal ring 44 causes a seal ring face 58 of the seal ring 44 to engage a mating surface 70 on a mating ring 42 to effect a seal.

In accordance with accepted mechanical face seal technology, the seal ring 44 remains stationary as the shaft 24 and corresponding mating ring 42 rotate. Thus, a dynamic seal is established between the seal ring face 58 and mating surface 70. The foregoing description of a mechanical face seal assembly notwithstanding, the present invention hereinafter set forth may be used with any type of seal assembly utilizing some type of face seal or deriving its sealing ability through some type of face seal.

As illustrated in FIG. 2, a cup gasket 40 is positioned between the inner sleeve 60 and the mating ring 42. The cup gasket 40 provides a static seal between the inner sleeve 60 and the mating ring 42. Compressive force exerted by the spring 56 through the seal ring 44 causes axial compression of the cup gasket 40 between the inner sleeve 60 and the mating ring 42. Thus, a seal is formed by axial compression which sandwiches the cup gasket 40 between the inner sleeve 60 and mating ring 42. As set forth more fully herein, no radial compression of the cup gasket 40 is used in obtaining or maintaining the seal.

Figure 3:
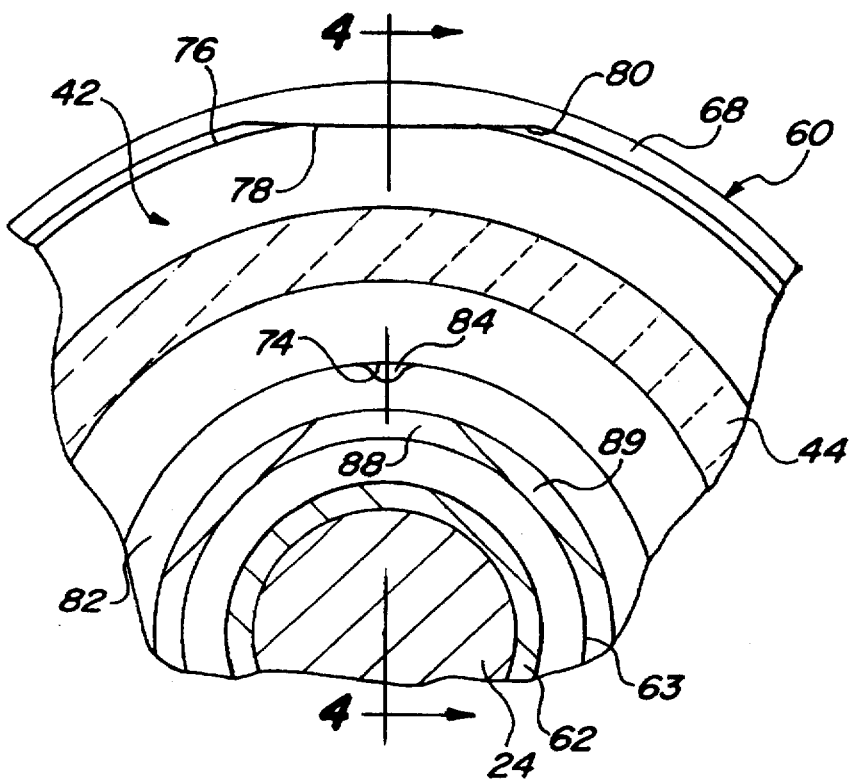
FIG. 3 is a partial sectional view of the seal assembly of FIG. 1 taken along lines 3—3 of FIG. 1.
Figure 4:
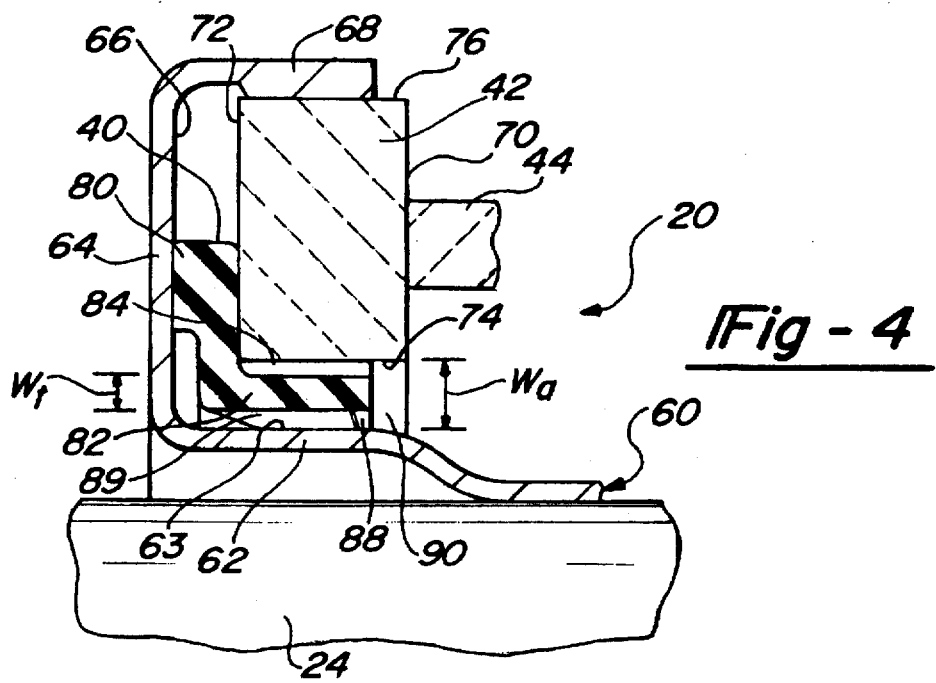
FIG. 4 is a sectional view of the seal assembly of FIG. 1 taken along line 4—4 of FIG. 3.
Figure 5:
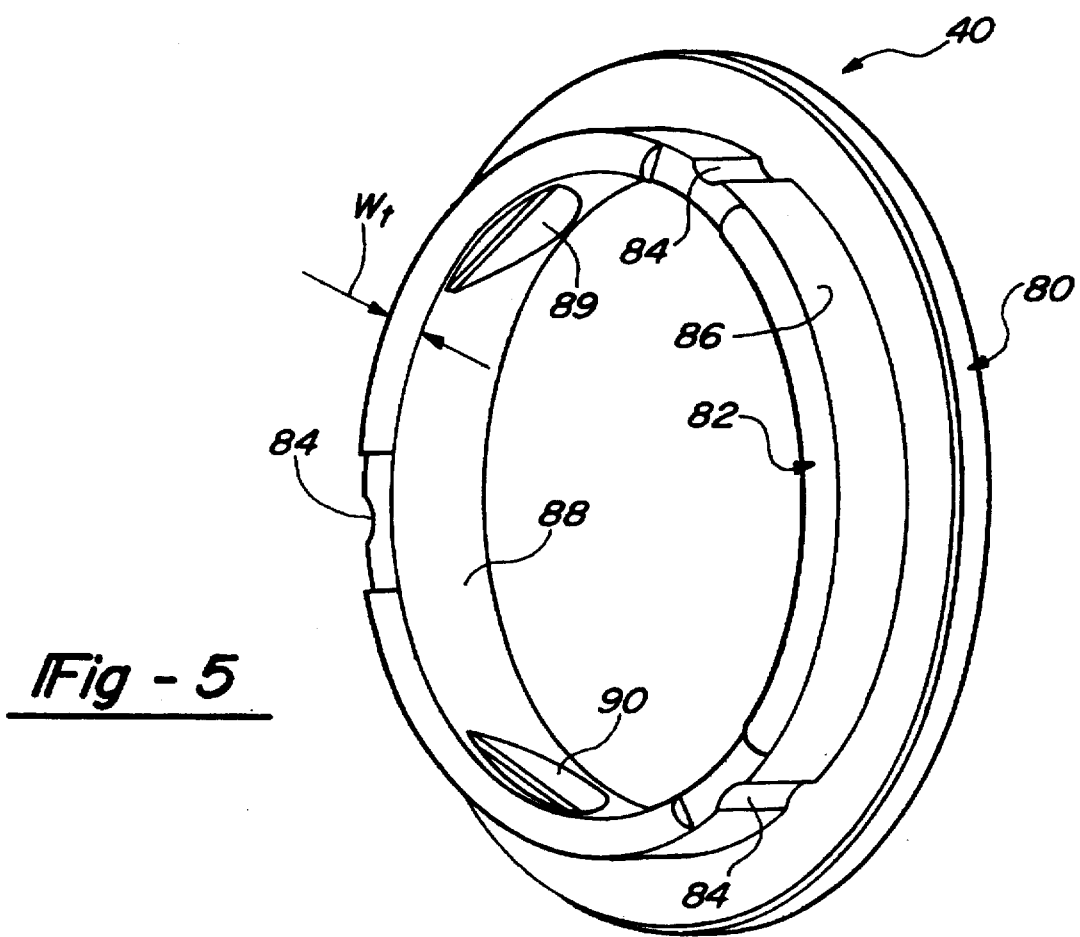
FIG. 5 is a perspective view of a cup gasket according to the present invention for use in the seal assembly of FIG. 1.

Turning now to FIGS. 3–5, a cup gasket 40 in accordance with one embodiment of the invention is shown. As illustrated in FIG. 4, the cup gasket 40 is positioned between an inner circumferential flange 62 of the inner sleeve 60 and the mating ring 42. The inner circumferential flange 62 is press fit or frictionally fit to the shaft 24 and rotates with the shaft 24. The inner sleeve 60 further includes a radially extending side portion 64 having an axial inner surface 66 and an outer circumferential flange 68 attached opposite the inner circumferential flange 62 such that the inner sleeve 60 has a U or J-shaped cross-section, with one leg; i.e., the inner circumferential flange 62, placed adjacent the shaft 24. The mating ring 42 is placed within the U-shaped cross-section. The mating ring 42 includes a mating surface 70, an axial side surface 72, an inner circumferential surface 74 and an outer circumferential surface 76 opposite the inner circumferential surface 74. In accordance with the present invention, the inner and outer circumferential surfaces 74, 76 of the mating ring are radial surfaces and the mating surface 70 and axial side surface 72 are axial surfaces; i.e., they extend substantially transverse the axis of the shaft 24.

As illustrated more fully in FIG. 3, the outer circumferential surface 76 of the mating ring includes a plurality of flat portions 78 which engage corresponding flat sections 80 on the outer circumferential flange 68 of the inner sleeve 60 to prevent rotational movement of the mating ring 42. Thus, the mating ring 42 rotates with the inner sleeve 60 and shaft 24.

The cup gasket 40 provides a static seal when sandwiched between the axial side surface 72 of the mating ring 42 and the axial inner surface 66 of the inner sleeve 60. The cup gasket 40 includes a flange portion 80 and a tubular portion 82, the tubular portion 82 extending axially and the flange portion 80 extending radially. The inner diameter of the mating ring 42 and the outer diameter of the inner circumferential flange 62 are different such that an annulus or gap 90 is formed between the inner circumferential surface 74 of the mating ring 42 and the outer circumferential surface 63 of the inner circumferential flange 62. As shown in FIG. 4, the differences in diameters result in the annulus 90 having a width ($w_a$). The tubular portion 82 of the gasket 40 has a width ($w_t$). It should be appreciated that the width of the tubular portion ($w_t$) is less than the width of the annulus ($w_a$) for at least a section of the tubular portion 82. The differences in thickness result in a clearance between the tubular portion 82 and the mating ring 42 and the tubular portion 82 and the inner sleeve 60 through which any leakage of the sealed fluid 35 may be detected. As illustrated in FIG. 5, the clearance between the mating ring 42 and the tubular portion 82 takes the form of a plurality of channels or gaps 84 extending axially along the tubular portion 82. The gaps are on the outer circumferential surface 86 of the tubular portion 82. Pads 89 which are substantially triangular in shape are equidistantly positioned on the inner circumferential surface 88 of the tubular portion 82. The gaps 84 and the pads 89 provide clearance between the tubular portion 82 and the mating ring 42 and the inner sleeve 60. The clearance provides a means to deflect any leakage occurring along either side of the flange portion 80 of the cup gasket 40.

The tubular portion 82, as shown in FIG. 3, has an outer diameter of an amount slightly greater than the inner diameter of the mating ring 42 slightly increasing the outer diameter of the tubular portion 82 which causes the cup gasket 40 to be held within the mating ring 42, thus forming a unitary assembly which may be positioned on the inner sleeve 60 and held in position by the pads 89. In keeping with a contemplated objective of the invention, the mounting force applied to the mating ring inner circumferential surface 74 is minimal and is exerted primarily at that section of the tubular portion 82 where the pads 89 are compressed against the inner sleeve 60 to hold the cup gasket 40 and the mating ring 42 assembly in place. In practice, it has been determined that such a mounting arrangement reduces the overall radial force applied to the mating ring 42, as compared to a conventional radially mounted gasket according to the prior art, by approximately eighty-two percent.

The pads 89 further provide positive centering of the mating ring 42 and cup gasket 40 with respect to the shaft 24 or inner sleeve 60 during and after seal assembly. As shown in FIG. 3, except at the locations of the pads 89, the inside of the tubular portion 82 of the gasket 40 provides a clearance or gap 88 around the inner sleeve 60 to provide a means for detecting any leakage between the flange portion 80 of the cup gasket 40 and the axial inner surface 66 of the inner sleeve 60. The small or slight interference fit of the outer circumferential surface 86 of the tubular portion 82 with the inner circumferential surface 74 of the mating ring 42 applies only that force necessary to maintain a connection between the two parts. Further, the gaps 84 provide a means for detecting any leakage occurring between the flange portion 80 of the cup gasket 40 and the axial side surface 72 of the mating ring 42.

Figure 6:
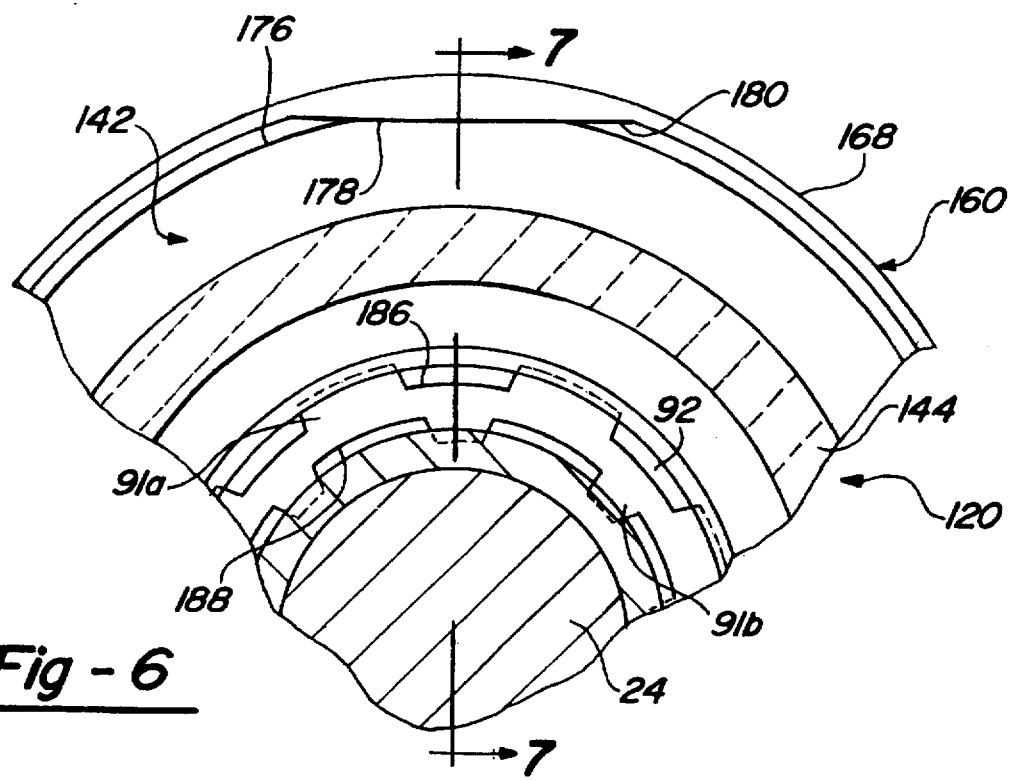
FIG. 6 is a partial sectional view of a second alternative embodiment of the seal assembly of FIG. 1 when viewed along line 3—3 of FIG. 1.
Figure 7:
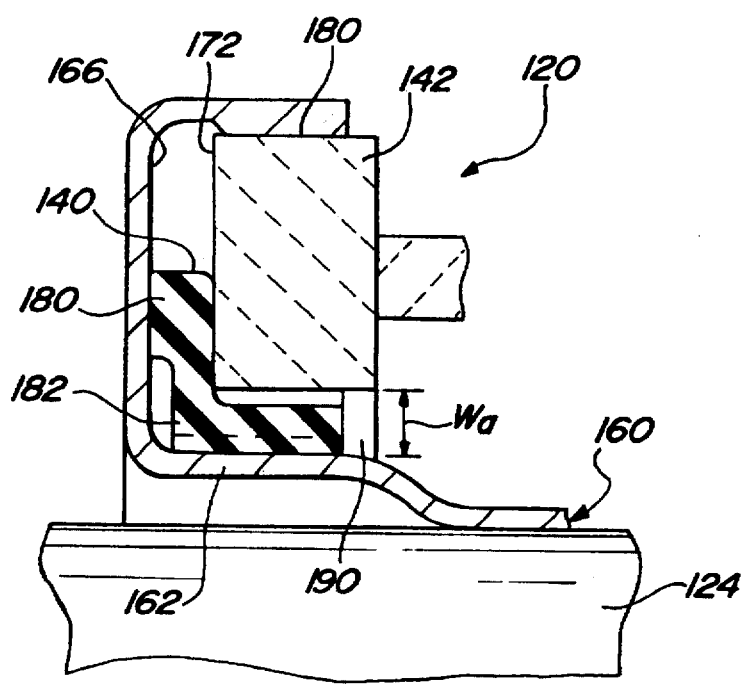
FIG. 7 is a sectional view taken along line 7—7 of FIG. 6.

Referring now to FIGS. 6 and 7, a seal assembly 120 according to a first alternative embodiment of the seal assembly 20 of the present invention is shown. Like parts of the seal assembly 120 have like reference numerals increased by 100. As set forth above, the mating ring 142 is positioned adjacent an inner sleeve 160 of the seal assembly 120. A cup gasket 140, including a flange portion 180 and a tubular portion 182, is positioned between the axial inner surface 166 of the inner sleeve 160 and the axial side surface 172 of the mating ring 142.

The cup gasket further includes a plurality of axial splines 91a, 91b on the outer circumferential surface 186 and on the inner circumferential surface 188 of the tubular portion 182. The outer splines 91a extend radially outward such that the outer diameter of the tubular portion 182 is slightly larger than the inside diameter of the mating ring 142. The inner splines 91b extend radially inward such that the inner diameter of the cup gasket 142 is slightly smaller than the outer diameter of the inner circumferential flange 162 of the inner sleeve 160. The dotted lines in FIG. 6 illustrate the size or height of the splines 91a, 91b prior to the tubular portion 182 being installed or pressed into the mating ring 142. The axial splines 91a, 91b result in an interference fit to hold the cup gasket 140 to the mating ring 142 and hold the cup gasket 140 to the inner sleeve 60. As shown in FIG. 6, the outer 91a and inner 91b splines are circumferentially offset such that axial grooves 92 are provided within the tubular portion 182 for detecting leakage past the static seal of the gasket.

It should be appreciated that if the axial inner and outer splines 91a, 91b are circumferentially narrower than the grooves 92 between them, or if they are offset angularly in respect to one another as shown in FIG. 6, a minimal radial mounting force is applied to the inside diameter of the mating ring 142. The depth, spacing and location of the outer 91a and inner 91b splines can be varied to provide a range of interference fits extending from direct compression when the outer 91a and inner 91b splines are in radial coinciding positions to undulating deflections when the outer 91a and inner 91b splines are spaced apart as set forth above.

Figure 8:
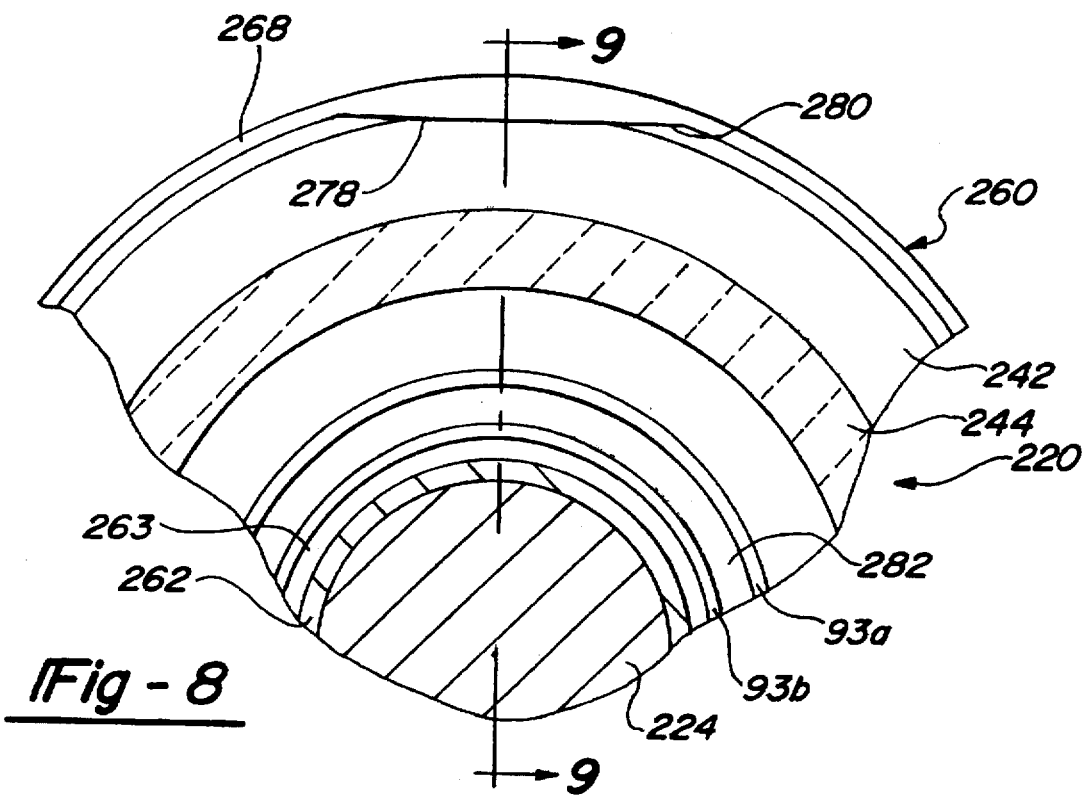
FIG. 8 is a partial sectional view of a third alternative embodiment of the seal assembly of FIG. 1 when viewed along line 3—3 of FIG. 1.
Figure 9:
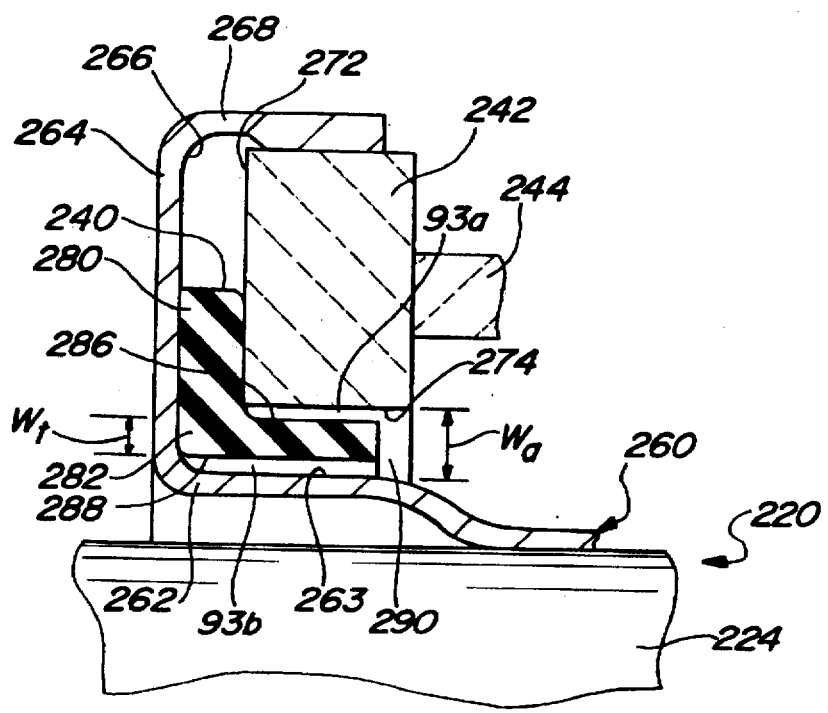
FIG. 9 is a sectional view taken along line 9—9 of FIG. 8.

Referring now to FIGS. 8 and 9, a seal assembly 220 according to a second alternative embodiment of the seal assembly 20 of the present invention is shown. Like parts of the seal assembly 220 have like reference numerals increased by a factor of 200. The seal assembly 220 is formed of a mating ring 242 and an inner sleeve 260 having a cup gasket 240 sandwiched axially therebetween. As shown in FIG. 9, the inner sleeve 260 includes a side portion 264 having an axial inner surface 266. The mating ring includes an axial side surface 272 such that a flange portion 280 of the cup gasket 240 forms a static seal between the respective axial surfaces. The cup gasket 240 further includes a tubular portion 282 extending into an annulus 290 formed between the inner circumferential surface 274 of the mating ring 242 and the outer circumferential surface 263 of the inner circumferential flange 262. As shown in FIG. 9, the width ($w_t$) of the tubular portion 282 is less than the width of the annulus ($w_a$). As a space 93a, 93b exists between the tubular portion 282 and both the mating ring 242 and the inner sleeve 260, no radial compressive force is supplied to the mating ring 242 by the tubular portion 282 of the cup gasket 240. It should also be seen that the space 93a between the inner circumferential surface 274 of the mating ring 242 and the outer circumferential surface 286 of the tubular portion 282 and the space 93b between the inner circumferential surface 288 of the tubular portion 282 and the outer circumferential surface 263 of the inner sleeve 260 result in a means to detect any fluid leakage when pressure is applied to the static seal formed by the flange portion 280 of the gasket 240.

Figure 10:
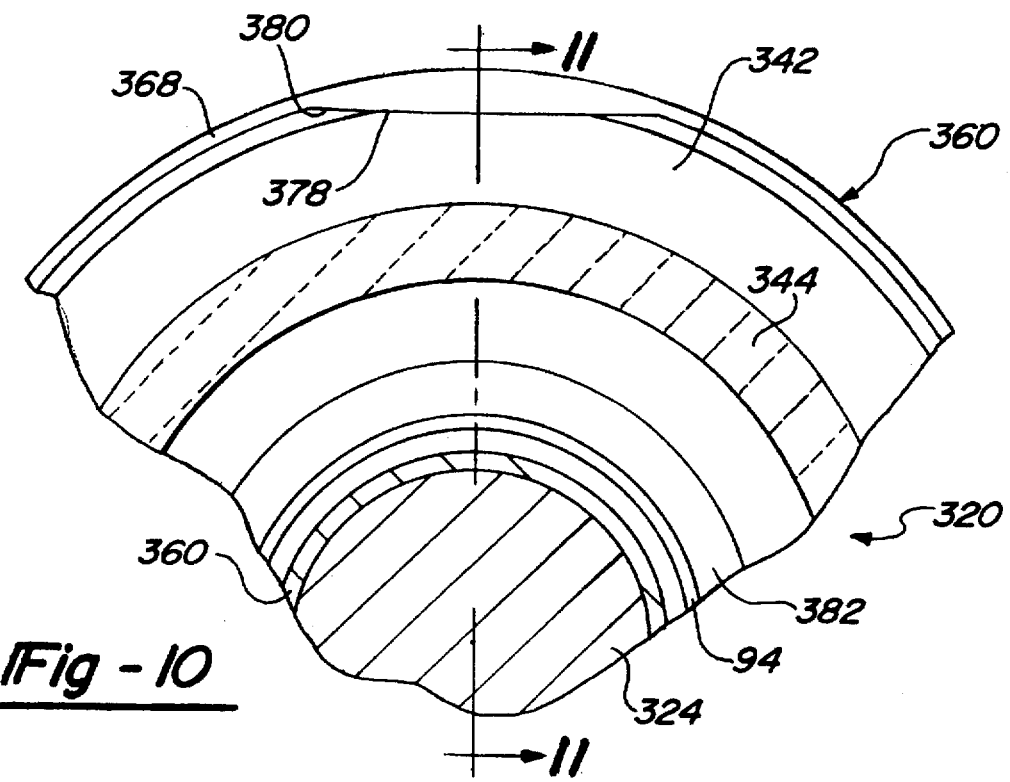
FIG. 10 is a partial sectional view of a fourth alternative embodiment of the seal assembly of FIG. 1 when viewed along line 3—3 of FIG. 1.
Figure 11:
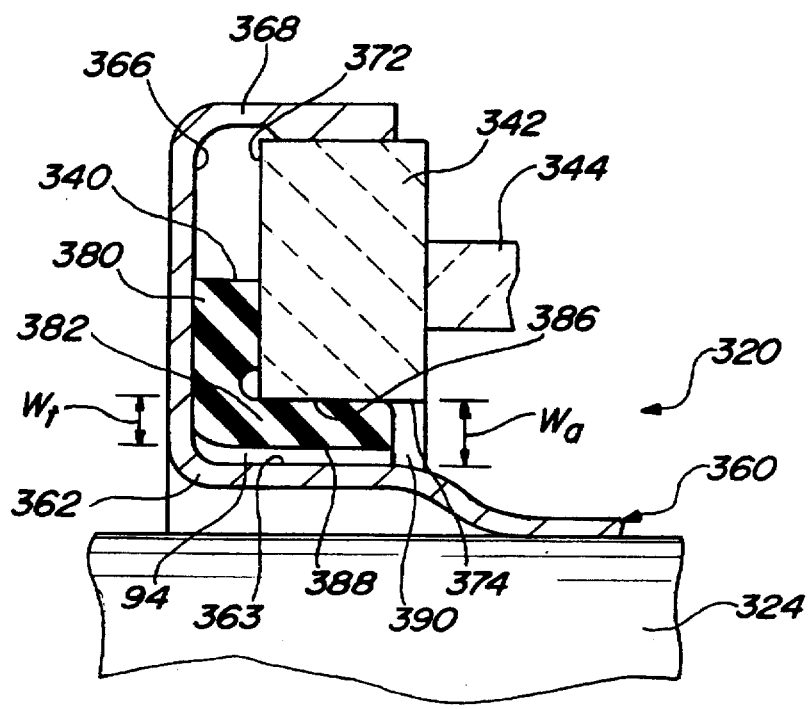
FIG. 11 is a sectional view taken along line 11—11 of FIG. 10.

Referring now to FIGS. 10–11, a seal assembly 320 according to a third alternative embodiment of the seal assembly 20 of the present invention is shown. Like parts of the seal assembly 320 have like reference numerals increased by a factor of 300. Turning to FIG. 11, the seal assembly includes a mating ring 342, an inner sleeve 360 and a cup gasket 340. A static seal is formed by axial compression of a flange portion 380 of the cup gasket 340 between an axial side surface 372 of the mating ring 342 and an axial inner surface 366 of the inner sleeve 360. The mechanics of such a seal have been set forth previously. The cup gasket 340 further includes a tubular portion 382, the tubular portion having a thickness ($w_t$) as illustrated in FIG. 11. The tubular portion 382 has an outer circumferential surface 386 which engages or contacts an inner circumferential surface 374 of the mating ring 342. As the width ($w_t$) of the tubular portion 382 is less than the width ($w_a$) of the annulus 390 formed between the mating ring 342 and the inner circumferential flange 362 of the inner sleeve 360, a clearance or gap 94 exists between the outer circumferential surface 363 of the inner circumferential flange 362 and the inner circumferential surface 388 of the cup gasket 340. Thus, any leakage occurring between the interface occurring at the axial inner surface 366 and flange 380 will escape or be detected through the gap 94. Any leakage occurring between the axial side surface 372 of the mating ring 342 and the flange portion 380 will cause a deflection of the tubular portion 382 of the cup gasket 340 radially inward, thus creating a second gap to allow detection of any leakage.

It should be seen that such a mounting arrangement results in minimal radial mounting forces applied to the inner diameter or inner circumferential surfaces of the mating ring 342. Once again, the tubular portion 382 may be made slightly larger than the inner diameter of the mating ring 342 to result in a slight interference fit enabling the mating ring 342 and cup gasket 340 to be assembled and handled as a single unit.

Figure 12:
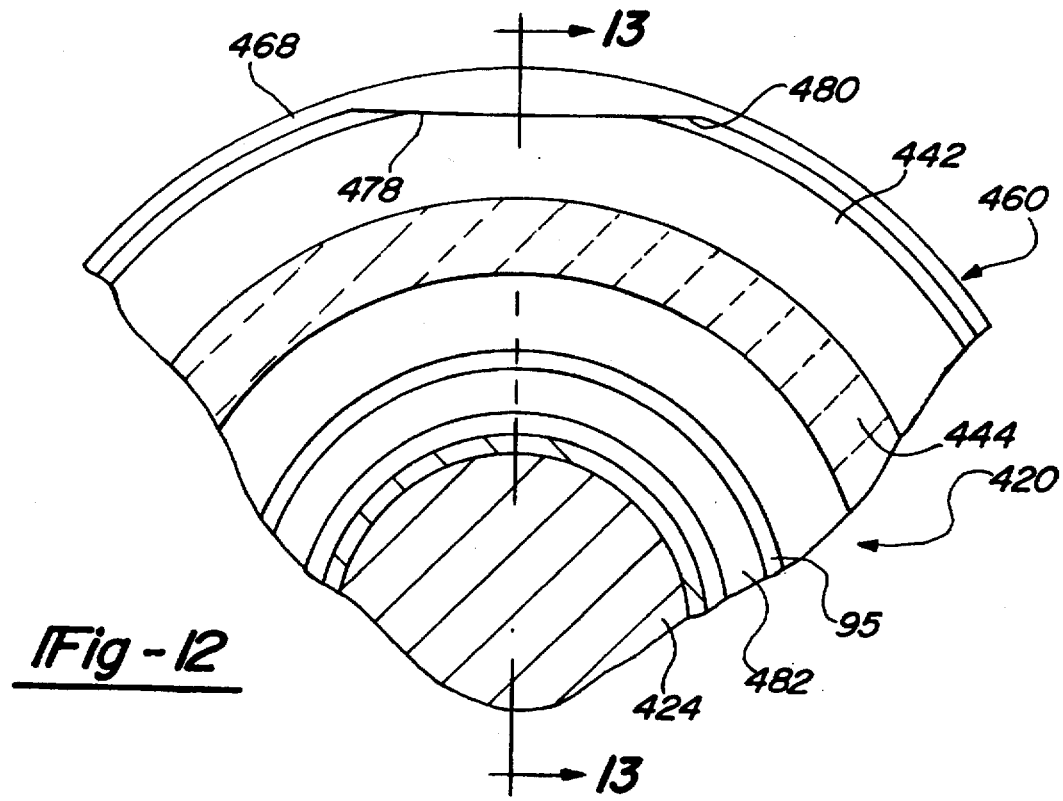
FIG. 12 is a partial sectional view of a fifth alternative embodiment of the seal assembly of FIG. 1 when viewed along line 3—3 of FIG. 1.
Figure 13:
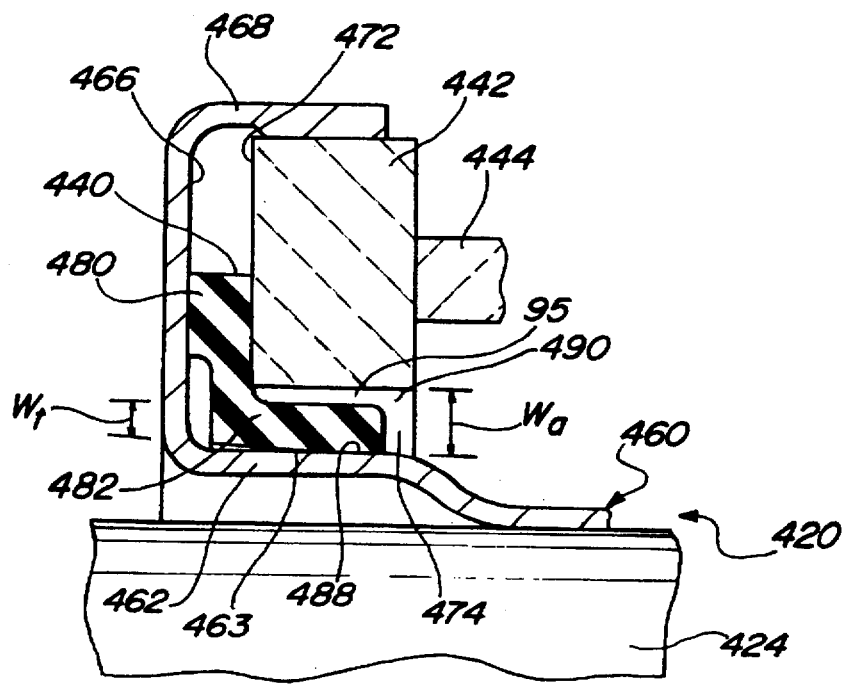
FIG. 13 is a sectional view taken along line 13—13 of FIG. 12.

Referring now to FIGS. 12 and 13, a seal assembly according to a fourth alternative embodiment of the seal assembly 20 of the present invention is shown. Like parts of the seal assembly 420 have like reference numerals increased by a factory of 400. Turning to FIG. 13, the seal assembly includes a mating ring 442, an inner sleeve 460 and a cup gasket 440. A static seal is formed by axial compression of a flange portion 480 of the cup gasket 440 between an axial side surface 472 of the mating ring 442 and an axial inner surface 466 of the inner sleeve 460.

As shown in FIG. 13, the tubular portion 482 of the gasket 440 has a width ($w_t$) which is less than that of the width ($w_a$) of the annulus 490. The tubular portion 482 has an inner diameter less than that of the outer diameter of the inner circumferential flange 462 such that the inner circumferential surface 488 of the tubular portion 482 engages the outer circumferential surface 463 of the inner sleeve 460. Such an arrangement forms a space or gap 95 between the mating ring 442 and the tubular portion 482 of the cup gasket 440. It will be seen that any leakage occurring between the flange portion 480 of the cup gasket 440 and the axial side surface 472 of the mating ring 442 will escape through the gap 95 between the tubular portion 482 and inner circumferential surface 474 of the mating ring 442. Any leakage occurring between the flange portion 480 and the axial inner surface 466 of the inner sleeve 460 will cause the tubular portion 482 to deflect radially outward thus creating a second gap between the tubular potion 482 of the cup gasket 440 and the inner sleeve 460 to allow fluid to escape for detection purposes. It should be appreciated that in the enclosed embodiment no radial mounting force is applied to the mating ring 442. Further, by forming the inner diameter of the tubular portion 482 slightly smaller than the outer diameter of the inner sleeve 460, the cup gasket 440 will be held in place on the inner sleeve 460 prior to installation of the mating ring 442.

Figure 14:
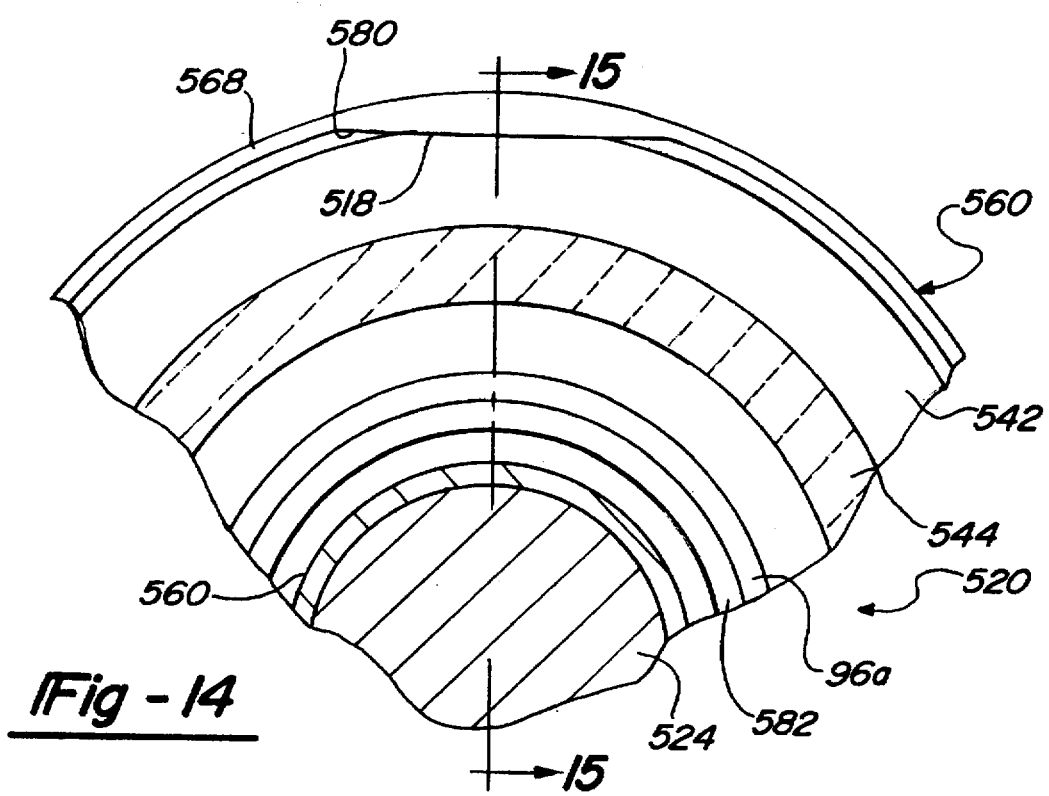
FIG. 14 is a partial sectional view of a sixth alternative embodiment of the seal assembly of FIG. 1 when viewed along line 3—3 of FIG. 1.
Figure 15:
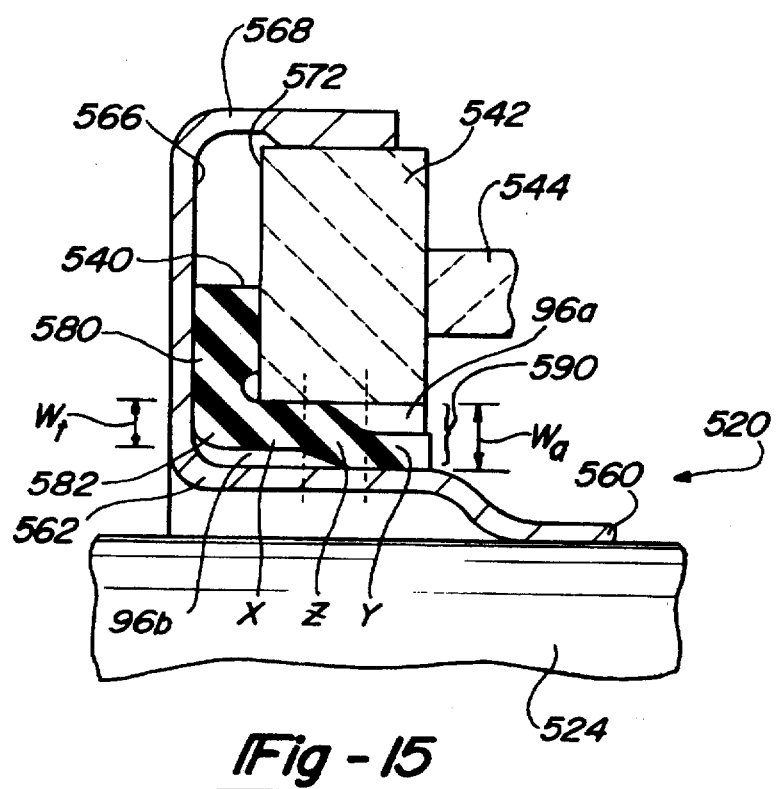
FIG. 15 is a sectional view taken along line 15—15 of FIG. 14.

Referring now to FIGS. 14 and 15, a seal assembly 520 according to a fifth alternative embodiment of the seal assembly 20 of the present invention is shown. Like parts of the seal assembly 520 have like reference numerals increased by a factory of 500. The seal assembly includes a mating ring 542, an inner sleeve 560 and a cup gasket 540. A static seal is formed by axial compression of a flange portion 580 of the cup gasket 540 between an axial side surface 572 of the mating ring 542 and an axial inner surface 566 of the inner sleeve 560. The mechanics of such a seal have been set forth previously.

The tubular portion 582 of the cup gasket 540, as shown in FIG. 15, is of a width ($w_t$) which is less than the width ($w_a$) of the annulus 590. However, the outer diameter of the tubular portion 582 is slightly larger than the inner diameter of the mating ring 542 for a portion of the axial length (x) of the tubular portion 582 and has a inner diameter slightly less than the outer diameter of the inner sleeve 560 for portion (y) of the axial length of the tubular portion 582. The two axial portions (x) and (y) are separated by a transition zone (z). Thus, the portions of increased (x) and decreased (y) diameter of the tubular portion 582 provide an interference fit to hold or maintain the seal components in the proper position during assembly.

It will be seen that leakage between the flange 580 and the axial side surface 572 of the mating ring 542 will deflect that portion (x) of the tubular portion radially inward allowing the fluid to escape through the gap 96a for detection purposes. Leakage under pressure between the flange portion 580 and the axial inner surface 566 of the inner sleeve 560 will deflect the portion (y) of the tubular portion 582 radially outward through the gap 96b and allow the fluid to escape for detection purposes.

It should be appreciated that the mounting force applied to the inner diameter of the mating ring by the tubular portion 582 of the gasket 540 applies only along the axial portion (x) which is minimal.

Referring now to FIG. 2a, a seal assembly 620 according to a sixth alternative embodiment of the seal assembly 20 of the present invention is shown. Like parts of the seal assembly 620 have like reference numerals increased by a factor of 600. As shown in FIG. 2a, the seal assembly utilizes a mating ring 642 and cup gasket 640 sandwiched or compressed against the shaft 624 and impeller hub 625. Thus, it is not necessary to provide axial compression of the flange portion 680 of the gasket 640 against an inner sleeve. It is sufficient to compress the flange portion 680 against a seal surface, the seal surface may comprise the axial inner surface 66 of an inner sleeve 60 (see FIG. 2) or it may comprise an axial surface 665 on a rotating member such as the impeller 625. When desired, the flange member 680 simply seals against the impeller hub 625 rather than an inner sleeve. It should be appreciated that each of the foregoing seal assemblies and cup gasket configurations may be used without an inner sleeve by sandwiching the flange portion 680 of the cup gasket 640 against the impeller hub 625. In each of the foregoing alternative embodiments, the width ($w_t$) of tubular portion 682 is less than the width ($w_a$) of the annulus 690.

From the foregoing, it will be seen that a mechanical face seal utilizing a gasket assembly as set forth above reduces the effects of elastomer compression-set, creep, stress relaxation, shrinkage due to exposure to fluids being sealed, thermal expansion or contraction of the elastomer, and tolerances of the seal parts. Thus, the gasket is sealed by the compressive force exerted by the seal ring on the mating ring. Such axial force creates an axial seal between the mating ring and the inner sleeve whereby clearance between the mating ring and tubular portion of the gasket and inner sleeve and tubular portion of the gasket provides a means for detecting or ascertaining seal leaks and determining seal integrity.

I claim:

1. A seal assembly for mounting between a shaft and a housing, one of which is rotating with respect to the other, comprising:

a seal casing, said seal casing including an outer case and an inner case;

an inner sleeve secured to said shaft;

a seal ring, said seal ring connected to said seal casing by a deflectable seal element;

a spring, positioned between said seal casing and said seal ring, said spring operative to urge said seal ring in an axial direction;

a mating ring having a mating surface and a side surface;

a cup gasket, said cup gasket having a flange portion and a tubular portion, said flange portion positioned between said side surface of said mating ring and a radial inner surface of said inner sleeve such that said flange portion of said gasket is sandwiched between said radial inner surface of said inner sleeve and said side surface of said mating ring to form a static seal, said tubular portion includes a plurality of pads, said pads positioned on an inner circumferential surface of said tubular portion;

said mating ring includes an inner circumferential surface spaced from an outer circumferential surface of an inner circumferential flange of said inner sleeve such that an annulus of determined width is formed between the mating ring and inner sleeve and said tubular portion of said gasket extending axially within said annulus having a determined width wherein the width of said tubular portion is less than the width of said annulus.

2. A seal assembly as set forth in claim 1, wherein said pads are triangular in shape and are equidistantly positioned on the inner circumferential surface.

3. A seal assembly for mounting between a shaft and a housing, one of which is rotating with respect to the other, comprising:

a seal casing, said seal casing including an outer case and an inner case;

an inner sleeve secured to said shaft;

a seal ring, said seal ring connected to said seal casing by a deflectable seal element;

a spring, positioned between said seal casing and said seal ring, said spring operative to urge said seal ring in an axial direction;

a mating ring having a mating surface and a side surface;

a cup gasket, said cup gasket having a flange portion and a tubular portion, said flange portion positioned between said side surface of said mating ring and a radial inner surface of said inner sleeve such that said flange portion of said gasket is sandwiched between said radial inner surface of said inner sleeve and said side surface of said mating ring to form a static seal;

said mating ring includes an inner circumferential surface spaced from an outer circumferential surface of an inner circumferential flange of said inner sleeve such that an annulus of determined width is formed between the mating ring and inner sleeve and said tubular portion of said gasket extending axially within said annulus having a determined width wherein the width of said tubular portion is less than the width of said annulus;

means for detecting the occurrence of leakage between the flange portion and the side surface of said mating ring and the flange portion and the radial inner surface of said inner sleeve.

4. A seal assembly as set forth in claim 3, wherein said means for detecting the occurrence of leakage includes said tubular portion and said mating ring.

5. A seal assembly as set forth in claim 4 including said tubular portion placed between said inner circumferential surface of said mating ring and said outer circumferential surface of the inner circumferential flange.

6. A seal assembly as set forth in claim 4 wherein said tubular portion has an outer diameter greater than an inner diameter of said inner circumferential surface of said mating ring such that said tubular portion engages said inner circumferential surface of said mating ring when the mating ring is placed on said gasket.

7. A seal assembly as set forth in claim 4 wherein said tubular portion has an inner diameter less than an outer diameter of said inner circumferential flange such that an interference fit is created between said tubular portion and said inner sleeve.

8. A seal assembly as set forth in claim 4 wherein said tubular portion has an outer diameter slightly larger than the inner diameter of said mating ring for a portion of the axial length of said tubular portion and said tubular portion further has an inner diameter slightly less than the outer diameter of the inner sleeve for a portion of the axial length of said tubular portion, said axial portions of varying diameter separated by a transition zone.

9. A seal assembly as set forth in claim 4 including a plurality of channels extending axially along an outer circumferential surface of said tubular portion and a plurality of pads, said pads positioned on an inner circumferential surface of said tubular portion.

10. A seal assembly according to claim 3 wherein said means further includes a plurality of axial splines located on an outer circumferential surface of said tubular portion and on the inner circumferential surface of said tubular portion, said tubular portion further including a plurality of axial grooves between said splines.

11. A seal assembly as set forth in claim 10 wherein said inner splines extend radially inward such that an inner diameter of the tubular portion is slightly smaller than an outer diameter of a circumferential flange of said inner sleeve and the outer splines extend radially outward such that an outer diameter of said tubular portion is slightly greater than an inner diameter of said mating ring wherein such an arrangement results in an interference fit between said tubular portion of said cup gasket and said inner sleeve and said mating ring.

12. A seal assembly for mounting between a shaft and a housing, one of which is rotating with respect to the other, comprising:

a mating ring having a mating surface and a radial side surface;

a seal surface, said seal surface connected to said shaft;

a gasket comprising a flange portion and a tubular portion, said flange portion compressed between said seal surface and said mating ring to form a seal between said mating ring and said seal surface;

means for detecting the occurrence of leakage between said seal surface and said gasket and said gasket and said mating ring;

said means for detecting the occurrence of leakage includes said tubular portion having a determined width and said mating ring including an inner circumferential surface spaced from an outer circumferential surface of said shaft such that an annulus of determined width is formed between the mating ring and shaft wherein the width of said tubular portion is less than the width of said annulus.

13. A seal as set forth in claim 12 wherein said tubular portion is placed between said inner circumferential surface of said mating ring and said outer circumferential surface of said shaft.

14. A seal assembly as set forth in claim 12 wherein said tubular portion has an outer diameter greater than the inner diameter of said inner circumferential surface of said mating ring such that an interference fit is created between said tubular portion and said mating ring.

15. A seal assembly as set forth in claim 12 wherein said seal surface comprises an inner sleeve having a radial inner surface on a radially extending side portion such that said gasket is compressed between said radial inner surface and said mating ring to form a seal.

16. A seal assembly as set forth in claim 12 wherein said seal surface comprises an impeller mounted to said shaft, said impeller including a radial surface wherein said gasket is compressed between said radial surface on said impeller and said mating ring to form the seal.

\* \* \* \* \*